(12) United States Patent
Aizawa

(10) Patent No.: US 11,809,032 B2
(45) Date of Patent: Nov. 7, 2023

(54) DISPLAY DEVICE AND PROJECTION TYPE DISPLAY DEVICE

(71) Applicant: JVCKENWOOD Corporation, Yokohama (JP)

(72) Inventor: Tadashi Aizawa, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/858,564

(22) Filed: Jul. 6, 2022

(65) Prior Publication Data

US 2022/0334428 A1 Oct. 20, 2022

Related U.S. Application Data

(63) Continuation of application No. PCT/JP2020/047939, filed on Dec. 22, 2020.

(30) Foreign Application Priority Data

Jan. 14, 2020 (JP) ................................. 2020-003375

(51) Int. Cl.
| | | |
|---|---|---|
| *G02F 1/1333* | (2006.01) | |
| *G03B 21/00* | (2006.01) | |
| *G03B 21/16* | (2006.01) | |

(52) U.S. Cl.
CPC ..... *G02F 1/133382* (2013.01); *G03B 21/006* (2013.01); *G03B 21/16* (2013.01)

(58) Field of Classification Search
CPC ......... G02F 1/133382; G02F 1/133385; G03B 21/006; G03B 21/16; H04N 5/272; H04N 9/3105; H04N 9/3144; H04N 17/002
See application file for complete search history.

(56) References Cited

U.S. PATENT DOCUMENTS 10,027,935 B2 * 7/2018 Aikoh .................. H04N 9/3152

FOREIGN PATENT DOCUMENTS

| JP | 2003-43442 A | 2/2003 |
|---|---|---|
| JP | 2011-180325 A | 9/2011 |
| JP | 2018-36447 A | 3/2018 |
| JP | 2019-3123 A | 1/2019 |

* cited by examiner

*Primary Examiner* — Anne M Hines
*Assistant Examiner* — Jose M Diaz
(74) *Attorney, Agent, or Firm* — Nath, Goldberg & Meyer; Jerald L. Meyer

(57) ABSTRACT

A liquid crystal display element includes a pixel region which optically modulates received illumination light for each pixel. A heat sink dissipates heat of the liquid crystal display element. A first mask member is fixed to the heat sink, is formed of a material having a lower heat transfer rate than the heat sink, includes a first opening of which the size corresponds to the size of the pixel region, and masks unnecessary light. A second mask member is arranged at a position further away from the liquid crystal display element than the first mask member, is fixed to the heat sink, is formed of a material having a higher heat transfer rate than the first mask member, includes a second opening of which the size is equal to or larger than the size of the first opening, and masks the unnecessary light.

5 Claims, 6 Drawing Sheets

DISPLAY DEVICE AND PROJECTION TYPE DISPLAY DEVICE

CROSS REFERENCE TO RELATED APPLICATION

This application is a Continuation of PCT Application PCT/JP2020/047939, filed on Dec. 22, 2020, and claims the priority of Japanese Patent Application No. 2020-003375, filed on Jan. 14, 2020, the entire contents of both of which are incorporated herein by reference.

BACKGROUND

The present disclosure relates to a display device and a projection type display device.

A projection type display device has been popular. A display device having a liquid crystal display element of the projection type display device modulates illumination light that has been received. The projection type display device projects an image based on the modulated illumination light. As described in Japanese Unexamined Patent Application Publication No. 2003-43442 (Patent Literature 1), a display device has a light shielding mask which blocks unnecessary light. The unnecessary light is emitted to a position outside of a pixel region of a liquid crystal display element and does not contribute to image projection. By blocking unnecessary light by means of the light shielding mask, it is possible to suppress deterioration in the quality of a projection image due to stray light and also deterioration in the stability of the projection image caused by the temperature rise of the liquid crystal display element.

SUMMARY

In recent years, the energy of illumination light emitted to display devices has increased in accordance with the increase in the luminance of projection type display devices. Therefore, light shielding masks tend to become higher in temperature than before. Suppose that a high-temperature light shielding mask is positioned close to a liquid crystal display element. In the above case, the heat of the light shielding mask propagates to the liquid crystal display element due to radiation, and the temperature of the liquid crystal display element rises. Due to the above, it is conceivable to arrange the light shielding mask away from the liquid crystal display element. However, if the light shielding mask is positioned away from the liquid crystal display element, unnecessary light that obliquely enters at a position near an end of a pixel region is less likely to be blocked by means of the light shielding mask. Therefore, the light shielding capability deteriorates.

Japanese Unexamined Patent Application Publication No. 2019-3123 (Patent Literature 2) discloses a light shielding mask which can make it difficult for heat of a light shielding mask to be propagated to a liquid crystal display element, and with which there is no deterioration of the light shielding capability. The light shielding mask disclosed in Patent Literature 2 includes four inclined portions which are close to the liquid crystal display element at a position near the outer peripheral portion of a pixel region and are inclined so as to be away from the liquid crystal display element from the pixel region toward a position outside the pixel region. However, it is not easy to manufacture a light shielding mask having four inclined portions. In addition, an optical component which is supposed to be positioned near the front surface of the liquid crystal display element has to be disposed in a position which is away from the front surface at least by the thickness of the inclined portions.

A first aspect of one or more embodiments provides a display device including: a liquid crystal display element that includes a pixel region in which a plurality of pixels are arranged and which optically modulates received illumination light for each pixel; a heat sink that dissipates heat of the liquid crystal display element; a first mask member that is fixed to the heat sink, is formed of a material having a lower heat transfer rate than the heat sink, includes a first opening of which a size corresponds to a size of the pixel region, and masks unnecessary light among the illumination light, the unnecessary light being light not entering the pixel region of the liquid crystal display element; a second mask member that is arranged at a position further away from the liquid crystal display element than the first mask member, is fixed to the heat sink, is in contact with the first mask member, is formed of a material having a higher heat transfer rate than the first mask member, includes a second opening of which a size is equal to or larger than the size of the first opening, and masks the unnecessary light; an optical member that is arranged at a position further away from the liquid crystal display element than the second mask member; and a pressing plate that is arranged at a position further away from the liquid crystal display element than the optical member, is fixed to the heat sink with the second mask member therebetween while being in contact with the second mask member and the optical member, includes a third opening of which a size is larger than the size of the second opening, and presses the optical member.

A second aspect of one or more embodiments provides a projection type display device including: a display device for generating a red image that modulates received red illumination light in accordance with a red component of an image to be displayed and generates red image light; a display device for generating a green image that modulates received green illumination light in accordance with a green component of an image to be displayed and generates green image light; a display device for generating a blue image that modulates received blue illumination light in accordance with a blue component of an image to be displayed and generates blue image light; a synthesis optical system that generates synthesis image light by synthesizing the red image light, the green image light, and the blue image light; and a projection lens that projects the synthesis image light, wherein the above-described display device is used as the display device for generating a red image, the display device for generating a green image, and the display device for generating a blue image.

DETAILED DESCRIPTION

Hereinafter, a display device and a projection type display device according to one or more embodiments will be described with reference to the accompanying drawings. First, a configuration example and a function effect of a display device according to one or more embodiments will be described with reference to FIGS. 1 to 5C.

Figure 1:
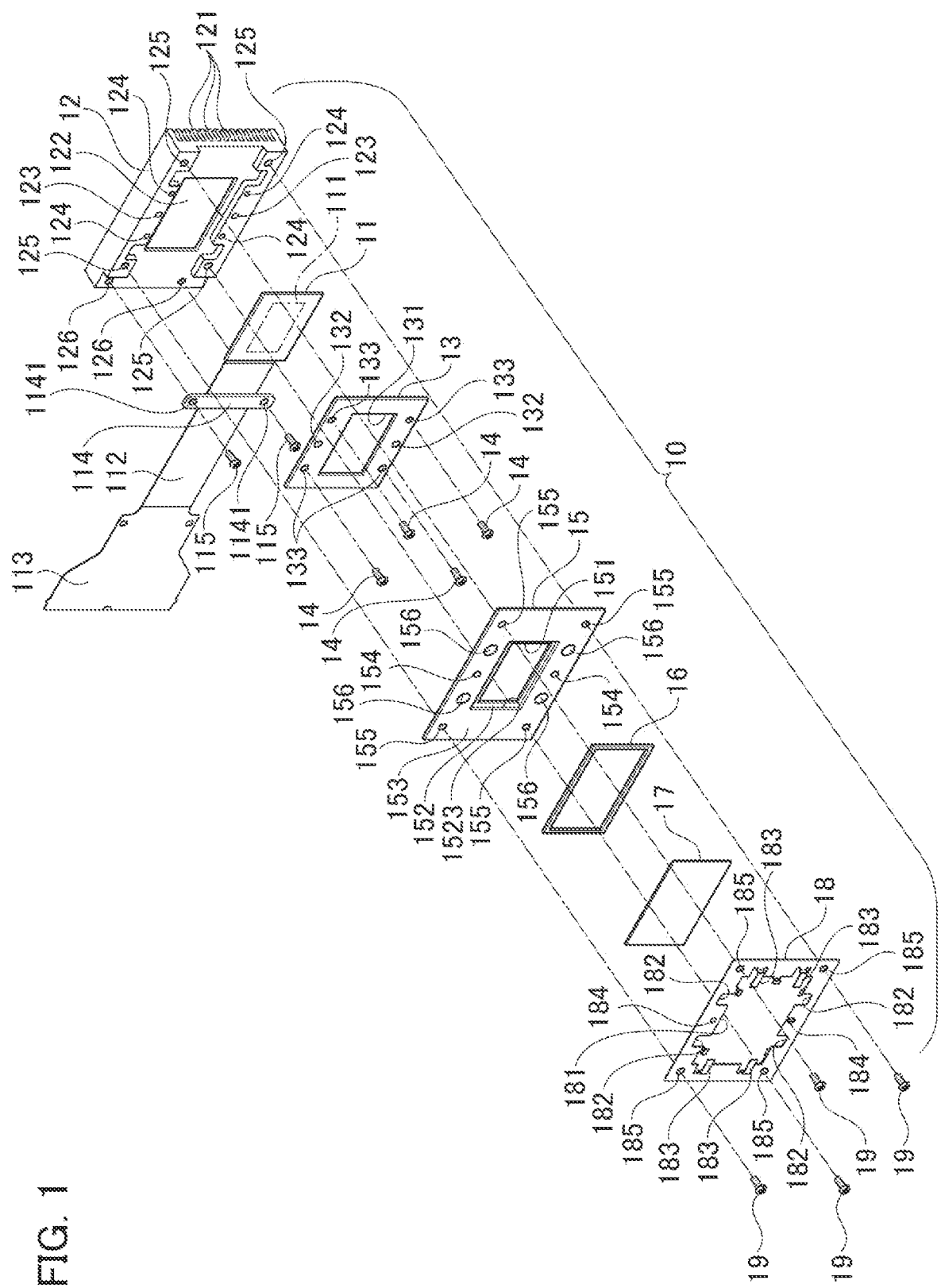
FIG. 1 is an exploded perspective view illustrating a display device according to one or more embodiments.
Figure 2:
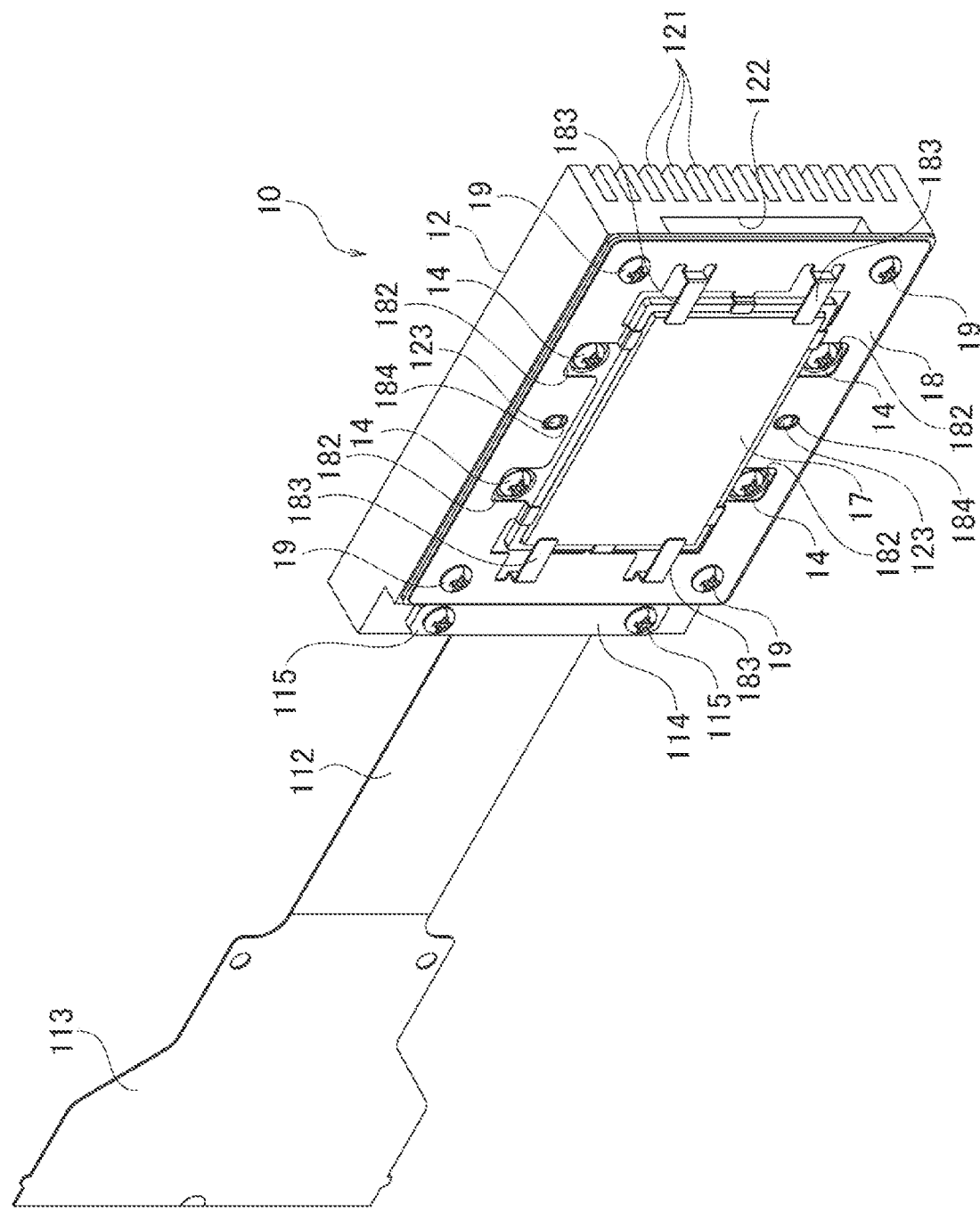
FIG. 2 is a perspective view illustrating a display device according to one or more embodiments.

FIG. 1 is an exploded perspective view of a display device 10 according to one or more embodiments shown in FIG. 2. A liquid crystal display element 11 shown in FIG. 1 is a reflective liquid crystal display element. The liquid crystal display element 11 may be a liquid crystal display element that is referred no as a LCOS (liquid crystal on silicon) element. The liquid crystal display element 11 has a rectangular pixel region 111 surrounded by using a dash-dot-dash line. The pixel region 111 has a plurality of pixels arranged in two directions orthogonal to each other in a plane. The pixel region 111 optically modulates illumination light that has been entered for each pixel.

A flexible substrate 112 is connected to the liquid crystal display element 11. A connector connection terminal 113 is provided at an end of the flexible substrate 112 opposite to the liquid crystal display element 11 with the flexible substrate 112 therebetween. The connector connection terminal 113 is connected to a connector of an unillustrated circuit board for driving the liquid crystal display element 11.

Depending on the number of signal lines of the liquid crystal display element 11 or connection conditions such as wire bonding, the flexible substrate 112 may be connected in both the longer side direction and the shorter side direction of the liquid crystal display element 11.

A heat sink 12 is formed of an aluminum alloy and has a plurality of fins 121 formed on the rear surface side thereof. As an example, the heat sink 12 is formed of an aluminum alloy of material mark A6063, which is an aluminum alloy containing magnesium and silicon. The heat sink 12 may be formed of 1000 series pure-aluminum.

The heat sink 12 has a recess 122 for housing the liquid crystal display element 11, a pair of pins 123 used for positioning a first mask member 13 and a second mask member 15, and four screw holes 124 with which the first mask member 13 is screwed. Further, the heat sink 12 has four screw holes 125 with which the second mask member 15 and a pressing plate 18 are screwed and two screw holes 126 with which a pressing plate 114 is screwed.

Holes 1141 into which screws 115 are to be inserted are formed at both ends of the pressing plate 114. While the liquid crystal display element 11 is housed in the recess 122, the flexible substrate 112 is interposed between the heat sink 12 and the pressing plate 114. Then, the screws 115 that have been inserted into the holes 1141 are screwed into screw holes 126. Accordingly, the flexible substrate 112 is fixed to the heat sink 12.

The first mask member 13 is formed of a thin metal plate. The first mask member 13 is preferably a stainless plate having a thickness of 0.2 mm. As an example, the first mask member 13 is formed of stainless steel of material mark SUS304. Stainless steel has a lower thermal conductivity than aluminum and iron and has a heat transfer rate of 16.7 W/m·K. The thermal conductivity (heat transfer rate) of the first mask member 13 is lower than that of the heat sink 12.

An opening 131 (a first opening) is formed in the first mask member 13. The opening 131 has a size equivalent to the size of the pixel region 111 of the liquid crystal display element 11. That is, the opening 131 has substantially the same size as the pixel region 111. The first mask member 13 has a pair of holes 132 into which the pins 123 are to be inserted and four holes 133 into which four screws 14 are to be inserted.

While the liquid crystal display element 11 is housed in the recess 122 of the heat sink 12, the first mask member 13 is fixed to the heat sink 12 as follows: pins 123 are inserted into holes 132 for positioning, and then screws 14 that have been inserted into holes 133 are screwed into screw holes 124.

The second mask member 15 is formed of a thin metal plate. The second mask member 15 is preferably an aluminum plate having a thickness of 0.5 mm. As an example, the second mask member 15 is formed of a 5000 series aluminum alloy such as material mark A5052. The second mask member 15 may be formed of 1000 series pure-aluminum. Aluminum has a lower strength than stainless steel. Therefore, the thickness of the second mask member 15 is set to 0.5 mm, which is larger than the thickness of the first mask member 13 that is 0.2 mm. Suppose that the second mask member 15 is formed of an aluminum alloy of material mark A5052. In the above case, the second mask member 15 has a thermal conductivity of 140 W/m·K.

An opening 151 (a second opening) is formed in the second mask member 15. The size of the opening 151 is equal to or larger than the size of the opening 131 of the first mask member 13. The opening 151 is preferably slightly larger than the opening 131. The second mask member 15 has an inner peripheral portion 152 around the opening 151, an outer peripheral portion 153 positioned outside the inner peripheral portion 152, a pair of holes 154 into which the pins 123 are to be inserted, four holes 155 into which four screws 19 are to be inserted, and four holes 156 for avoiding interference with the screws 14. A stepped portion 1523 is formed between the inner peripheral portion 152 and the outer peripheral portion 153. The stepped portion 1523 is formed by a surface in a direction intersecting the surface of the second mask member 15.

A packing member 16 formed of rubber and a polarization adjustment member 17 are interposed between the second mask member 15 and the pressing plate 18, for example. The packing member 16 is arranged on the second mask member 15 such that the packing member 16 contacts the inner peripheral portion 152 and the stepped portion 1523. As will be described later, s-polarized light that has been emitted from the liquid crystal display element 11 enters the polarization adjustment member 17. The polarization adjustment member 17 adjusts the inclination of the s-polarized light and emits s-polarized light in which the inclination is uniform. Suppose that the liquid crystal display element 11 is configured to emit p-polarized light. In the above case, the polarization adjustment member 17 may adjust the inclination of the p-polarized light and emit p-polarized light in which the inclination is uniform.

An opening 181 having a size larger than that of the opening 151 of the second mask member 15 is formed in the pressing plate 18. The pressing plate 18 has four recesses 182 for avoiding interference with the screws 14, pressing pieces 183 for pressing the polarization adjustment member 17, a pair of holes 184 into which the pins 123 are to be inserted, and four holes 185 into which the four screws 19 are to be inserted. Each of the pressing pieces 183 is formed by cutting and raising and then bending an end of the pressing plate 18 on the side of the opening 181. The pressing plate 18 is formed of stainless steel or an aluminum alloy. The pressing pieces 183 have flexibility.

A recess 161 (see FIG. 3) in which the polarization adjustment member 17 is to be disposed is formed in the inner peripheral portion of the packing member 16. The polarization adjustment member 17 is disposed in the recess 161 of the packing member 16. While the packing member 16 and the polarization adjustment member 17 are interposed between the second mask member 15 and the pressing plate 18, the four screws 19 are inserted into the holes 185, then inserted into holes 155, and finally screwed into the screw holes 125. This fixes the second mask member 15, the packing member 16, the polarization adjustment member 17, and the pressing plate 18 to the heat sink 12.

As described above, the liquid crystal display element 11, the first mask member 13, the second mask member 15, the packing member 16, the polarization adjustment member 17, the pressing plate 18, and the pressing plate 114 are fixed to the heat sink 12. Accordingly, the display device 10 shown in FIG. 2 is formed.

Figure 3:
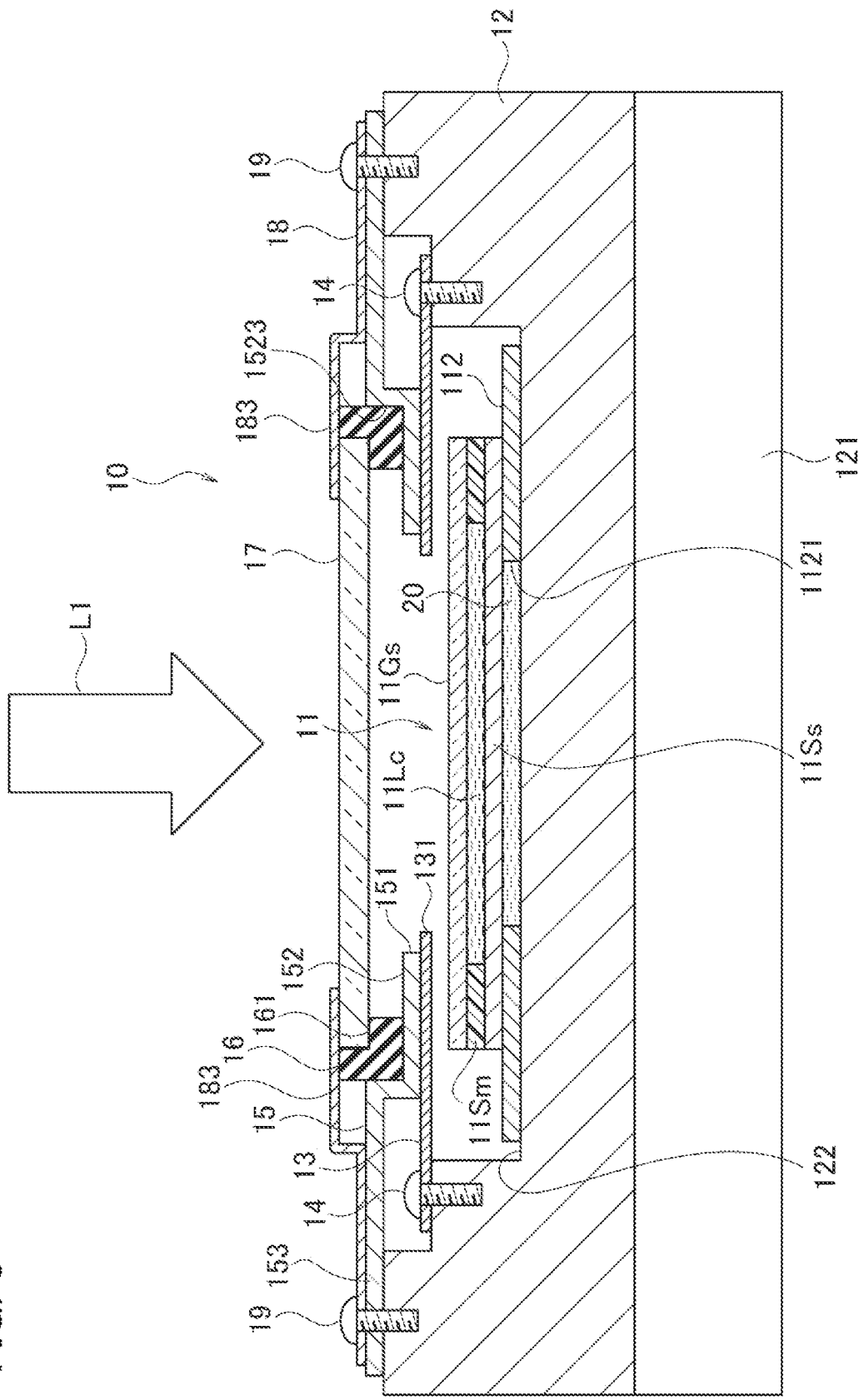
FIG. 3 schematic cross-sectional view illustrating a display device according to one or more embodiments.

FIG. 3 is a schematic cross-sectional view of the display device 10 shown in FIG. 2. The liquid crystal display element 11 has a configuration in which a liquid crystal 11Lc is interposed between a silicon substrate 11Ss having a plurality of pixels formed thereon and a glass substrate 11Gs, and the outer peripheral portion of the liquid crystal 11Lc is sealed by using a sealing material 11Sm. An opening 1121 is formed at an end of the flexible substrate 112 on the side of the liquid crystal display element 11. The liquid crystal display element 11 is disposed on the bottom surface of the recess 122 such that the silicon substrate 11Ss and the heat sink 12 are in contact with each other with a heat conductive material 20 therebetween. The heat conductive material 20 is a heat dissipation gel, for example. The heat conductive material 20 facilitates the conduction of heat generated in the liquid crystal display element 11 (particularly, in the silicon substrate 11Ss) to the heat sink 12.

The first mask member 13 is disposed close to the liquid crystal display element 11. The first mask member 13 and the second mask member 15 are arranged such that the center of the opening 131 substantially coincides with the center of the opening 151. The inner peripheral portion 152 of the second mask member 15 is in contact with the first mask member 13. Suppose that the opening 151 is set to be slightly larger than the opening 131. In the above case, the end of the first mask member 13 on the side of the opening 131 projects more inward than the end of the second mask member 15 on the side of the opening 151. In one or more embodiments, the end of the first mask member 13 on the side of the opening 131 projects 0.3 mm from the end of the second mask member 15 on the side of the opening 151.

The display device 10 is irradiated with illumination light L1 as shown in FIG. 3. When the display device 10 is irradiated with the illumination light L1, the second mask member 15 generates heat by receiving of part of the illumination light L1, and becomes high in temperature due to the heat propagated from the polarization adjustment member 17 and the pressing plate 18 of which the temperature has increased. The thermal conductivity of the first mask member 13 is lower than that of the second mask member 15 and the heat sink 12. Therefore, a larger amount of heat of the second mask member 15 propagates to the heat sink 12 than the first mask member 13.

Figure 4:
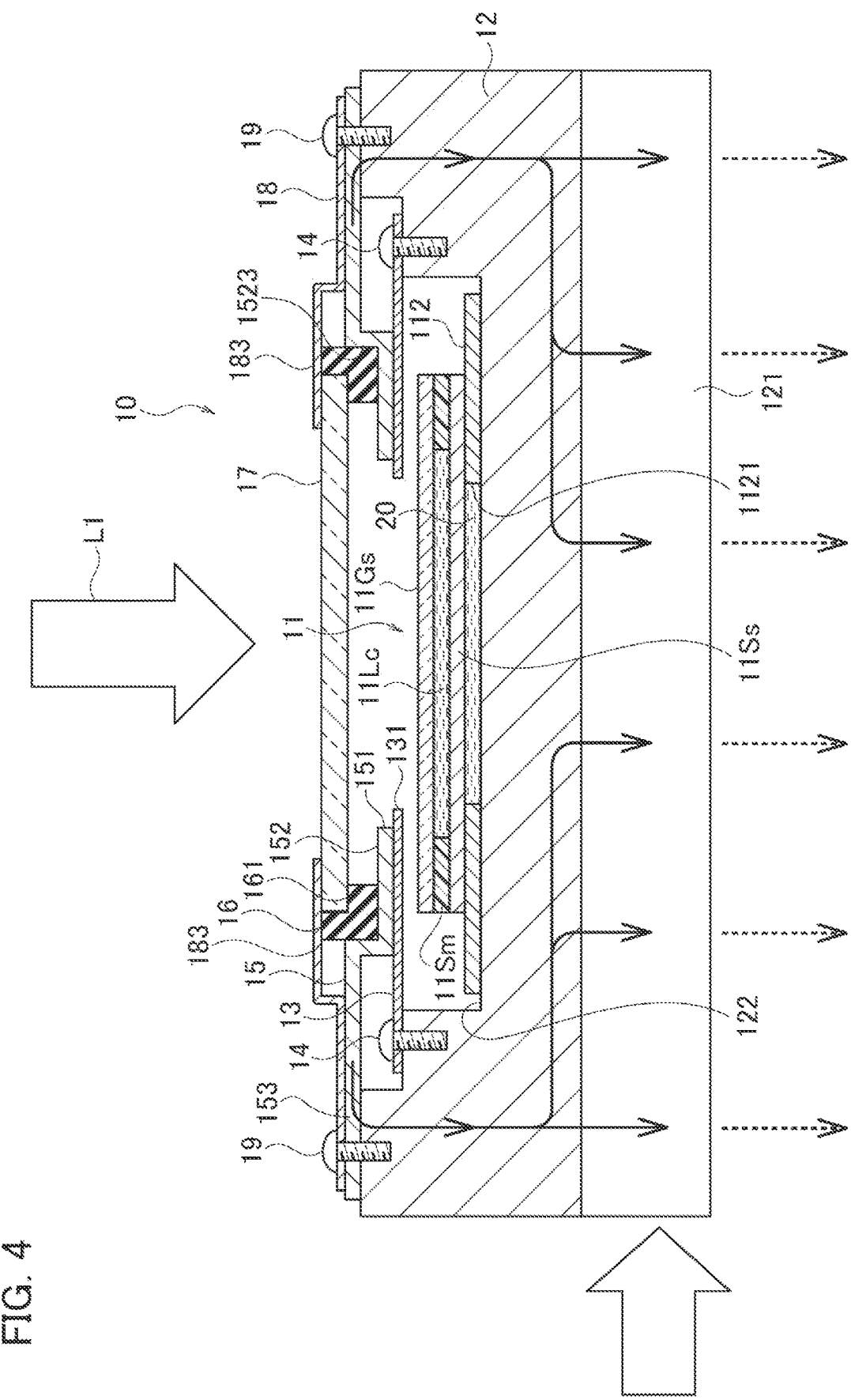
FIG. 4 is a schematic cross-sectional view illustrating how heat is dissipated in a display device according to one or more embodiments.

The heat of the second mask member 15 mainly propagates to the heat sink 12 as shown by using thick solid lines in FIG. 4. Air indicated by a white arrow is blown to the fin 121 of the heat sink 12 by means of a heat dissipation fan (not shown) and the air flows along surfaces of the fin 121. Accordingly, the heat that has been propagated to the heat sink 12 is dissipated as indicated by thick broken lines. Although not shown in FIG. 4, self-heat generated by driving the liquid crystal display element 11 is also dissipated by means of the heat sink 12.

In accordance with the display device 10 according to one or more embodiments, the temperature of the first mask member 13 does not become so high. Even if the temperature of the second mask member 15 becomes high, the heat of the second mask member 15 is efficiently dissipated by means of the heat sink 12. This can prevent an increase in the temperature of the liquid crystal display element 11 by preventing the heat of the second mask member 15 from propagating to the liquid crystal display element 11 due to radiation.

Figure 5A:
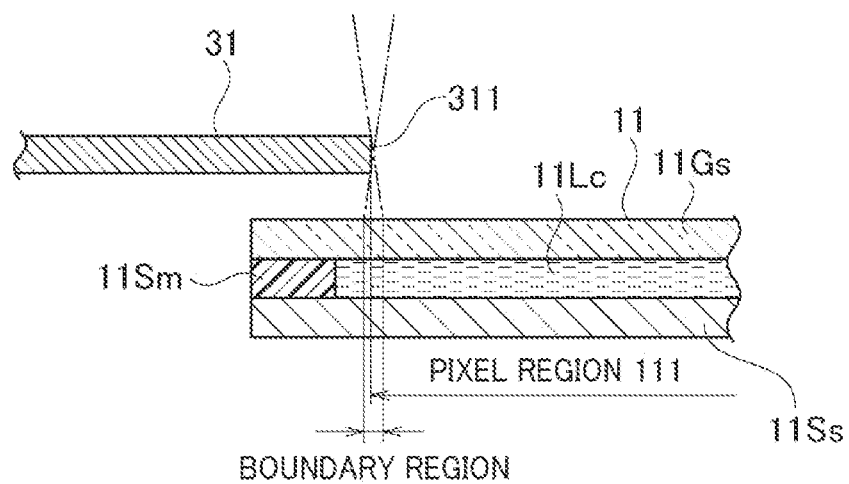
FIG. 5A is a partial cross-sectional view illustrating a state in which a thin mask member is disposed close to a liquid crystal display element.
Figure 5B:
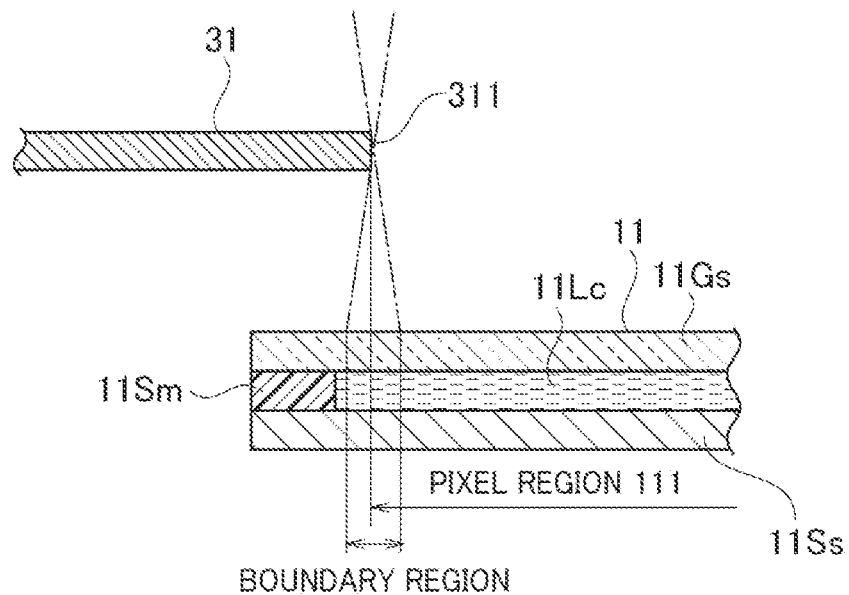
FIG. 5B is a partial cross-sectional view illustrating a state in which a thin mask member is disposed away from a liquid crystal display element.
Figure 5C:
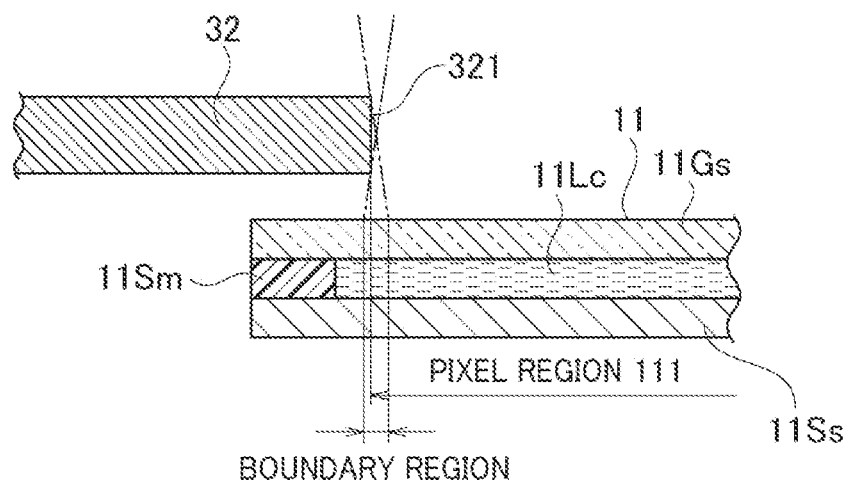
FIG. 5C is a partial cross-sectional view illustrating a state in which a thick mask member is disposed close to a liquid crystal display element.

With reference to FIGS. 5A to 5C, the function effects achieved by the display device 10 according to one or more embodiments will be described. FIG. 5A shows a state in which a thin mask member 31 is disposed close to the liquid crystal display element 11. FIG. 5B shows a state in which a thin mask member 31 is disposed away from the liquid crystal display element 11. FIG. 5C shows a state in which a thick mask member 32 is disposed close to the liquid crystal display element 11. The sizes of the openings formed in the mask members 31 and 32 correspond to the sizes of the pixel regions 111, and the positions of the opening-side ends 311 and 321 of the mask members correspond to the positions of the ends of the pixel regions 111.

The illumination light L1 emitted to the display device 10 does not necessarily enter in a direction orthogonal to the surface of the liquid crystal display element 11. The illumination light L1 is composed of light of which the angle is within a certain angle range. Therefore, light inclined obliquely and having an angle enters the liquid crystal display element 11. Light that enters at the end 311 of the mask member 31 or the end 321 of the mask member 32 in an oblique direction and is emitted to a position outside the pixel region 111 is unnecessary light.

As shown in FIG. 5A, if the thin mask member 31 is disposed close to the liquid crystal display element 11, the boundary region formed by the light that enters at the end 311 in an oblique direction is small. That is, the light shielding capability of the mask member 31 is excellent. As shown in FIG. 5B, if the thin mask member 31 is disposed away from the liquid crystal display element 11, the boundary region becomes large and the light shielding capability deteriorates.

In the display device 10 according to one or more embodiments, the first mask member 13 is disposed close to the liquid crystal display element 11. Therefore, the boundary region is small and the light shielding capability is excellent as in FIG. 5A.

As shown in FIG. 5C, if the thick mask member 32 is disposed close to the liquid crystal display element 11, the boundary region becomes large and the light shielding capability deteriorates. If the opening 151 of the second mask member 15 is made larger than the opening 131 of the first mask member 13, the state of the end of the first mask member 13 on the side of the opening 131 becomes equivalent to the state in which the thin mask member 31 is disposed as shown in FIG. 5A. Therefore, while the first mask member 13 and the second mask member 15 form a light shielding mask for blocking unnecessary light, it is possible to prevent deterioration in the light shielding capability due to an increase in the thickness of the light shielding mask.

However, suppose that the thickness of the combined first mask member 13 and second mask member 15 is extremely small. In the above case, even if the size of the opening 151 of the second mask member 15 is made equal to the size of the opening 131 of the first mask member 13, the light shielding capability does not deteriorate so much. Although the opening 151 of the second mask member 15 may have the same size as the opening 131 of the first mask member 13, the opening 151 of the second mask member 5 may be preferably larger than the opening 131 of the first mask member 13.

Further, in accordance with the display device 10 according to one or more embodiments, the light shielding mask (the first mask member 13 and the second mask member 15) can be manufactured easily and at a low cost, and the polarization adjustment member 17 can be arranged near the front surface of the liquid crystal display element 11. If the polarization adjustment member 17 can be arranged near the liquid crystal display element 11, the polarization adjustment member 17 can be reduced in size and the cost of the polarization adjustment member 17 can be reduced.

Figure 6:
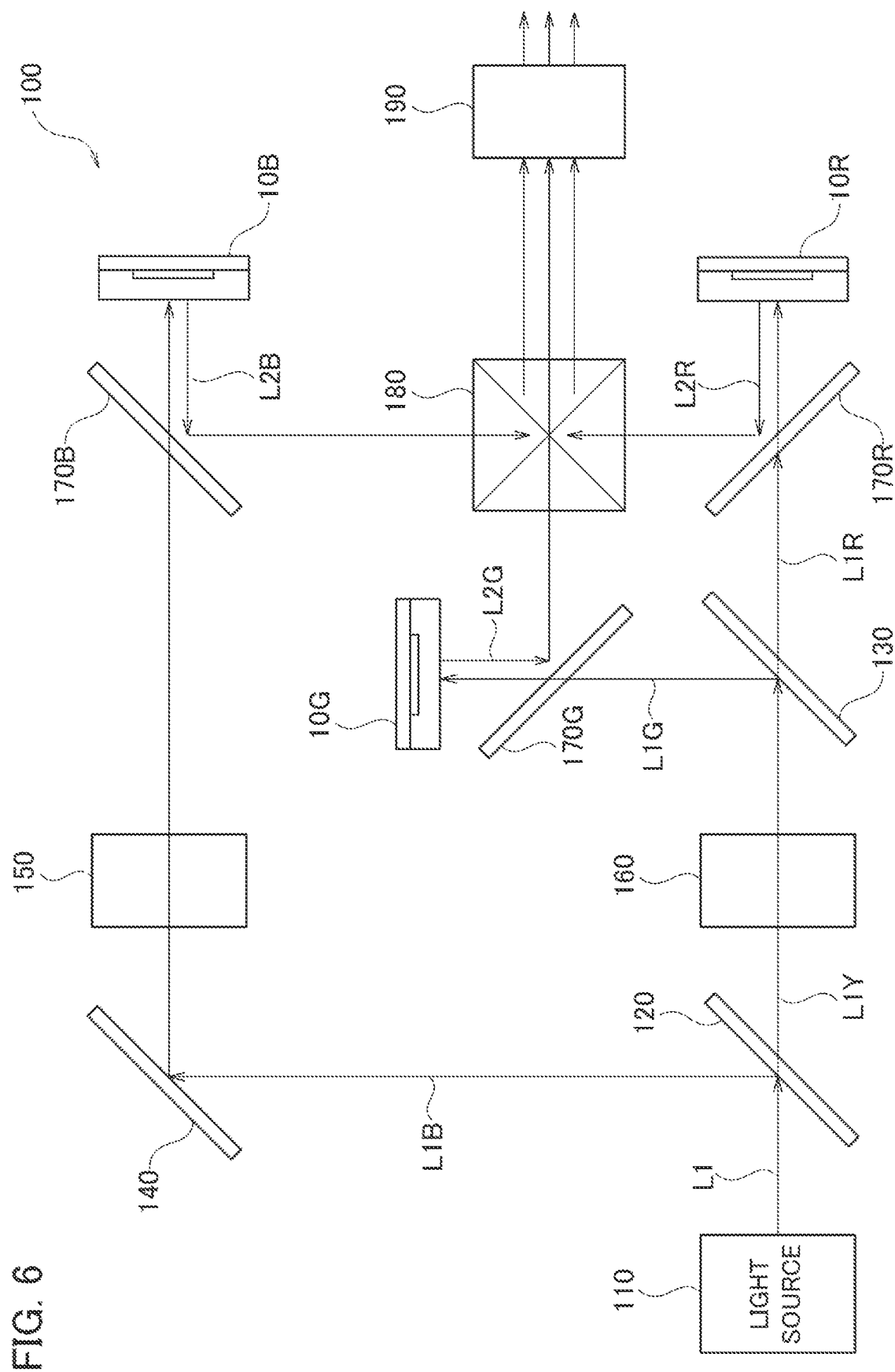
FIG. 6 is a configuration diagram illustrating a projection type display device according to one or more embodiments.

With reference to FIG. 6, a configuration example of a projection type display device 100 according to one or more embodiments including display devices 10 will be described. The projection type display device 100 includes a light source 110, dichroic mirrors 120 and 130, a reflection mirror 140, light uniformizing optical systems 150 and 160, polarization beam filters 170R, 170G, and 170B, a synthesis optical system 180, a projection lens 190, and three display devices 10. In order to distinguish the three display devices 10, the reference numeral 10R (a red image generating display device) is given to a display device 10 for generating a red image, the reference numeral 10G (a green image generating display device) is given to a display device 10 for generating a green image, and the reference numeral 10B (a blue image generating display device) is given to a display device 10 for generating a blue image. The display devices 10R, 10G, and 10B have the configurations that have been described with reference to FIGS. 1 to 3.

White illumination light L1 that has been emitted from the light source 110 enters the dichroic mirror 120. The dichroic mirror 120 reflects a blue component of the white illumination light L1 to form blue illumination light L1B. The dichroic mirror 120 allows a yellow component containing a red component and a green component of the white illumination light L1 to transmit therethrough to form yellow illumination light L1Y.

The blue illumination light L1B is reflected by the reflection mirror 140, and therefore, the optical path of the blue illumination light L1B is bent by 90 degrees. Thereafter, the blue illumination light L1B enters the light uniformizing optical system 150. The light uniformizing optical system 150 makes the illumination distribution of the blue illumination light L1B uniform and optimizes the polarization state. The light uniformizing optical system 150 is composed of the combination of an integrator (a fly-eye lens) or a light pipe and a polarizing plate or a polarization conversion system (PCS). The integrator and the light pipe make the illumination distribution of the blue illumination light L1B uniform. The polarizing plate and the PCS optimize the polarization state of the blue illumination light L1B. The light uniformizing optical system 150 emits only p-polarized light from among s-polarized light and p-polarized light of the blue illumination light L1B.

The p-polarized light of the blue illumination light L1B that has been emitted from the light uniformizing optical system 150 enters the polarization beam filter 170B. The polarization beam filter 170B allows the p-polarized light to transmit therethrough and reflects s-polarized light. The blue illumination light L1B which is the p-polarized light is transmitted through the polarization beam filter 170B and enters the display device 10B. The display device 10B modulates the blue illumination light L1B in accordance with a blue component of an image to be displayed, and emits blue image light L2B that is s-polarized light. The blue image light L2B is reflected by the polarization beam filter 170B and enters the synthesis optical system 180.

The yellow illumination light L1Y enters the light uniformizing optical system 160. The light uniformizing optical system 160 makes the illumination distribution of the yellow illumination light L1Y uniform and optimizes the polarization state. Similar to the light uniformizing optical system 150, the light uniformizing optical system 160 is composed of the combination of an integrator or a light pipe and a polarizing plate or a PCS. The integrator and the light pipe make the illumination distribution of the yellow illumination light L1Y uniform. The polarizing plate and the PCS optimize the polarization state of the yellow illumination light L1Y. The light uniformizing optical system 160 emits only p-polarized light from among s-polarized light and p-polarized light of the yellow illumination light L1Y.

The p-polarized light of the yellow illumination light L1Y that has been emitted from the light uniformizing optical system 160 enters the dichroic mirror 130. The dichroic mirror 130 reflects a green component of the yellow illumination light L1Y to form green illumination light L1G. The dichroic mirror 130 allows a red component of the yellow illumination light L1Y to transmit therethrough to form red illumination light L1R.

The green illumination light L1G enters the polarization beam filter 170G. The polarization beam filter 170G allows p-polarized light to transmit therethrough and reflects s-polarized light. The green illumination light L1G which is the p-polarized light is transmitted through the polarization beam filter 170G and enters the display device 10G. The display device 10G modulates the green illumination light L1G in accordance with a green component of an image to be displayed and emits green image light L2G that is s-polarized light. The green image light L2G is reflected by the polarization beam filter 170G and enters the synthesis optical system 180.

The red illumination light L1R enters the polarization beam filter 170R. The polarization beam filter 170R allows p-polarized light to transmit therethrough and reflects s-polarized light. The red illumination light L1R which is p-polarized light is transmitted through the polarization beam filter 170R and enters the display device 10R. The display device 10R modulates the red illumination light L1R in accordance with a red component of an image to be displayed and emits red image light L2R that is s-polarized light. The red image light L2R is reflected by the polarization beam filter 170R and enters the synthesis optical system 180.

The synthesis optical system 180 synthesizes the red image light L2R, the green image light L2G, and the blue image light L2B and emits synthesized image light. The projection lens 190 enlarges and projects, onto a screen (not shown), the synthesis image light that has been emitted from the synthesis optical system 180 as a full-color image. The screen displays the full-color image.

In accordance with the projection type display device 100 according to one or more embodiments, the temperature rise of the liquid crystal display element 11 of the display device 10 is suppressed. Therefore, it is possible to suppress the deterioration in the stability of a projection image caused by the temperature rise of the liquid crystal display element 11.

The present invention is not limited to one or more embodiments described above, and various modifications are possible without departing from the scope of the present invention. It is enough if the second mask member 15 is formed of a material having a higher heat transfer rate than the first mask member 13. Therefore, the second mask member 15 may be formed of a graphite sheet made of carbon instead of an aluminum plate. A graphite sheet has anisotropy in which heat is likely to propagate in the in-plane direction. Therefore, heat is less likely to propagate to the first mask member 13 and heat can be efficiently propagated to the heat sink 12.

The first mask member 13 and the second mask member 15 are materials that do not generate outgas or foreign substances even if light is received. It is enough if the thermal conductivity of the second mask member 15 is higher than that of the first mask member 13. The first mask member 13 and the second mask member 15 may be formed of other materials other than metal or carbon.

The display devices 10R, 10G, and 10B of the projection type display device 100 shown in FIG. 6 are each configured to receive p-polarized light and to emit s-polarized light. However, alternatively, the display devices 10R, 10G, and 10B may be configured to receive s-polarized light and to emit p-polarized light. It is also possible to combine s-polarized light and p-polarized light depending on each color.

What is claimed is:

1. A display device comprising:
a liquid crystal display element that includes a pixel region in which a plurality of pixels are arranged and which optically modulates received illumination light for each pixel;
a heat sink that dissipates heat of the liquid crystal display element;
a first mask member that is fixed to the heat sink, is formed of a material having a lower heat transfer rate than the heat sink, includes a first opening of which a size corresponds to a size of the pixel region, and masks unnecessary light among the illumination light, the unnecessary light being light not entering the pixel region of the liquid crystal display element;
a second mask member that is arranged at a position further away from the liquid crystal display element than the first mask member, is fixed to the heat sink, is in contact with the first mask member, is formed of a material having a higher heat transfer rate than the first mask member, includes a second opening of which a size is equal to or larger than the size of the first opening, and masks the unnecessary light;
an optical member that is arranged at a position further away from the liquid crystal display element than the second mask member; and
a pressing plate that is arranged at a position further away from the liquid crystal display element than the optical member, is fixed to the heat sink with the second mask member therebetween while being in contact with the second mask member and the optical member, includes a third opening of which a size is larger than the size of the second opening, and presses the optical member.

2. The display device according to claim 1, wherein
the heat sink is formed of aluminum or an aluminum alloy, the first mask member is formed of stainless steel, and the second mask member is formed of aluminum or an aluminum alloy.

3. The display device according to claim 1, wherein
the second opening is larger than the first opening, and an end of the first mask member near the first opening projects further inward than an end of the second mask member near the second opening.

4. The display device according to claim 1, wherein
a thickness of the second mask member is larger than a thickness of the first mask member.

5. A projection type display device comprising:
a display device for generating a red image that modulates received red illumination light in accordance with a red component of an image to be displayed and generates red image light;
a display device for generating a green image that modulates received green illumination light in accordance with a green component of an image to be displayed and generates green image light;
a display device for generating a blue image that modulates received blue illumination light in accordance with a blue component of an image to be displayed and generates blue image light;
a synthesis optical system that generates synthesis image light by synthesizing the red image light, the green image light, and the blue image light; and
a projection lens that projects the synthesis image light, wherein
the display device according to claim 1 is used as the display device for generating a red image, the display device for generating a green image, and the display device for generating a blue image.

* * * * *